United States Patent [19]

Ruperez

[11] 4,266,695
[45] May 12, 1981

[54] SUGAR DISPENSER

[76] Inventor: Armando Ruperez, Edificio 7, Local 7-C, Calle El Recreo, Sabana Grande, Caracas, Venezuela

[21] Appl. No.: 92,258

[22] Filed: Nov. 6, 1979

[51] Int. Cl.³ .............................................. B67D 5/06
[52] U.S. Cl. ................................. 222/185; 222/363; 222/339
[58] Field of Search ........ 222/339, 340, 344, 362–364, 222/368, 369, 185, 325; 221/266

[56] References Cited

U.S. PATENT DOCUMENTS

| 2,655,286 | 10/1953 | Barbaro | 222/185 |
| 4,019,660 | 4/1977 | Berkey | 222/339 |

FOREIGN PATENT DOCUMENTS 1144897 3/1963 Fed. Rep. of Germany.

Primary Examiner—H. Grant Skaggs
Attorney, Agent, or Firm—Jones, Tullar & Cooper

[57] ABSTRACT

A manually operable dispenser for delivering predetermined quantities of material such as sugar is disclosed. The dispenser is adapted to receive a bulk sugar container and to retain the container in an inverted position to prevent foreign materials such as moisture, dirt, dust and the like from entering the dispenser or container. The unit includes a divider wall in which is mounted a rotatable transfer drum having a receptacle with an opening on the surface of the drum. The drum is normally oriented so that the receptacle is in communication with the sugar container so that the receptacle is filled and ready for use. A drive mechanism is provided for rotating the drum to position the receptacle below the divider wall to dump a predetermined quantity of sugar out of the receptacle, the quantity depending upon the volume of the receptacle. The drum is biased to return to its initial position upon release of the dispensing mechanism.

13 Claims, 8 Drawing Figures

SUGAR DISPENSER

BACKGROUND OF THE INVENTION

The present invention relates, in general, to sugar dispensers, and more particularly to a manually operable dispenser which forms the base for a sugar container and which is adapted to dispense predetermined quantities of sugar upon actuation, while keeping the container closed when it is not in use.

Although dispensers for sugar containers for the type commonly used in restaurants or in homes to control the flow of sugar or to dispense only a predetermined quantity thereof are well known, such dispensers generally are of the cap type which are fitted on the top of a sugar container for actuation when the container is turned upside down. These containers and dispensers were developed because of the excessive waste of sugar products that occurs when sugar is placed on tables or counters in open containers from which sugar is served by means of spoons. Not only are open containers subject to contamination by dust or insects, but the serving spoons kept with the containers often were the source of moisture, food particles, or the like which made the sugar in the container unpalatable if not unuseable. The problems of wastage and contamination created by open containers were solved in part by the use of prepackaged servings of sugar where the sugar is contained in individual paper packages, each containing one serving. However, such packages greatly increase the cost of providing sugar, and for this reason numerous attempts have been made to develop bulk containers which would provide the protection against contamination and spillage as well as the convenience of single servings which has made paper packages so widely used, while reducing the cost to approximately that of the cost of bulk sugar.

Although prior dispensers have often provided adequate service, they have not been entirely satisfactory since they leave the cap and the dispensing orifice exposed and thus subject to an accumulation of moisture, dust, and the like. Further, such dispensers generally have a relatively small tip which is subject to being inadvertently immersed in the food or drink to which the sugar is being added, and thus are subject to contamination by accumulated material so that succeding quantities of sugar are not clean. Such accumulations, as well as the collection of moisture can cause rapid clogging of the dispensing mechanism. Finally, since the dispensing openings for such devices open upwardly, the sugar within the container itself is often subject to contamination.

Where such dispensers incorporate automatic devices for measuring a predetermined quantity of sugar they often require a dual motion of the container and cap for operation; i.e., the container must be turned upside down to load the dispenser, turned right-side up to permit the mechanism to adjust for dispensing, and then turned upside down again for dispensing. Alternatively, the dispenser must rely upon some gravity-operated mechanism to cut off the flow after a predetermined time period. The excessive complexity of such devices not only make them unreliable, but make them unduly expensive. Thus, dispensers of the type formed in caps for sugar containers, although desireable, have not met with success since they usually do not work properly, if at all.

SUMMARY OF THE INVENTION

The present invention overcomes the problems inherent in prior art cap-type devices by providing a dispenser which is adapted to form the base for a sugar container. The dispenser includes a housing having an upwardly opening portion which is adapted to receive and hold the container in an inverted position so that the contents thereof are always being supplied to the dispenser. A rotary transfer drum is located in a bottom wall of the dispenser and is normally in a position to keep the unit closed. Since the dispenser is located on the bottom of the container, the problem of accumulation of moisture and other contaminants is avoided. Further, by so locating the dispensing mechanism, the dispenser is always ready for use, and excessive inversions of the container to fill the dispensing mechanism are never required. This also insures a more accurate measure, since as long as there is any sugar left in the container, it will be fed to the dispensing mechanism. Finally, by providing the dispenser openings at the bottom of the device and surrounding it by a housing, the opening is protected, and is less likely to be immersed in the food to which the sugar is being applied.

Broadly speaking, the dispenser housing is generally cylindrical in shape, having a vertical axis and being horizontally divided at approximately its mid-point by a horizontal divider wall which closes the container to which the housing is connected. The generally cylindrical housing is thus divided into an upper portion which is internally threaded and adapted to receive a sugar container and a lower portion which forms a base for the dispenser/container assembly and forms, as well, an outlet passage for the dispenser. The horizontal divider wall cooperates with the upper portion of the housing to form a filler chamber which receives and stores sugar from the bulk container and feeds it to the dispenser mechanism.

Centrally located in the horizontal wall is a dispensing aperture adapted to receive the lower portion of a horizontally mounted transfer drum. The drum includes a receptacle for receiving material from the filling chamber, the receptacle preferably being in the form of a cavity located within the drum and having an opening on the surface of the drum. The drum is disposed so that the dispensing aperture is blocked thereby preventing the flow of sugar out of the container. The cavity opening is located in the filling chamber when the dispenser is not in use, with suitable biasing means being provided to hold the drum in this rest position. Means are provided for manually rotating the drum about its axis to move the cavity opening downwardly through the dispensing aperture in the divider wall so that the cavity opens into the dispensing chamber at the bottom of the unit, whereby the contents of the cavity are dumped out of the dispensing drum. With the drum in this position, the upper and lower chambers of the dispensing base unit remain separated from each other by the wall and by the closed surface of the drum so that only the predetermined quantity of sugar within the cavity is dispensed. Upon release of the dispensing mechanism, the drum is rotated back to its rest position.

The transfer drum is secured in the divider wall by means of a drive shaft which is biased toward the rest position by a means of a suitable biasing spring and which may be manually rotated through a predetermined angle sufficient to rotate the dispensing drum so that its opening is transferred from the filling chamber to the dispensing chamber. Preferably, the angle of rotation is limited to approximately 120°, this limitation being provided by a suitable slot formed in the driving shaft, the slot being engaged by a stop mechanism such as a screw. Rotation may be imparted to the drive shaft, in a preferred form of the invention, by means of a twist knob which may be grasped by the operator and turned to dispense the desired quantity of sugar. In an alternative form of the invention, rotation may be imparted by a push-button carrying one or more internal guide posts which engage corresponding slots on the surface of the drive shaft, whereby axial motion of the push-botton produces rotary motion of the drive shaft.

The dispenser mechanism is constructed from plastic, although metal may be used, so that it is inexpensive to make and easy to keep clean. Further, the presently disclosed construction is simple, utilizing a minimum number of parts, and is easy to assemble and disassemble either for cleaning or for replacement of parts. The particular mounting of the transfer drum, for example, permits easy interchangeability of drums so that they can be provided with cavities of various sizes to allow selection of the quantity to be dispensed. This is particularly important where diet restrictions limit the amount of sugar an individual is permitted to have, for in such a case a cavity that will hold, for example, 1 gram can be selected and will provide an accurate measure of the sugar being used.

BRIEF DESCRIPTION OF THE DRAWINGS

The foregoing and additional objects, features and advantages of the invention will become apparent to those of skill in the art from a consideration of the following detailed description of preferred embodiments thereof, taken in conjunction with the accompanying drawings in which.

DESCRIPTION OF PREFERRED EMBODIMENTS

Figure 1:
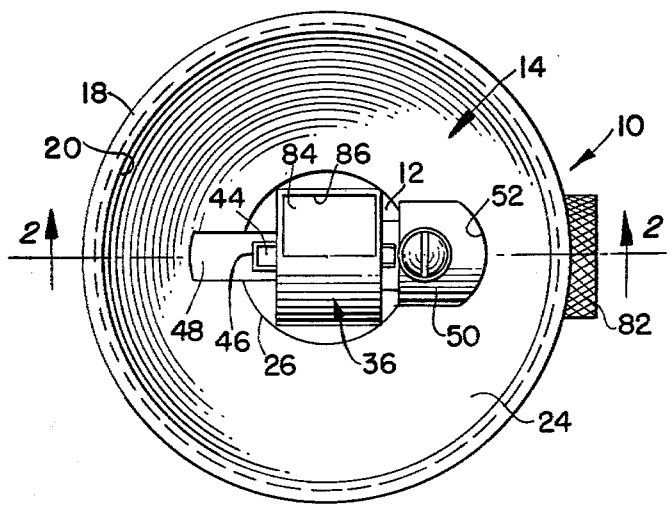
FIG. 1 is a top plan view of a dispenser constructed in accordance with the present invention.
Figure 2:
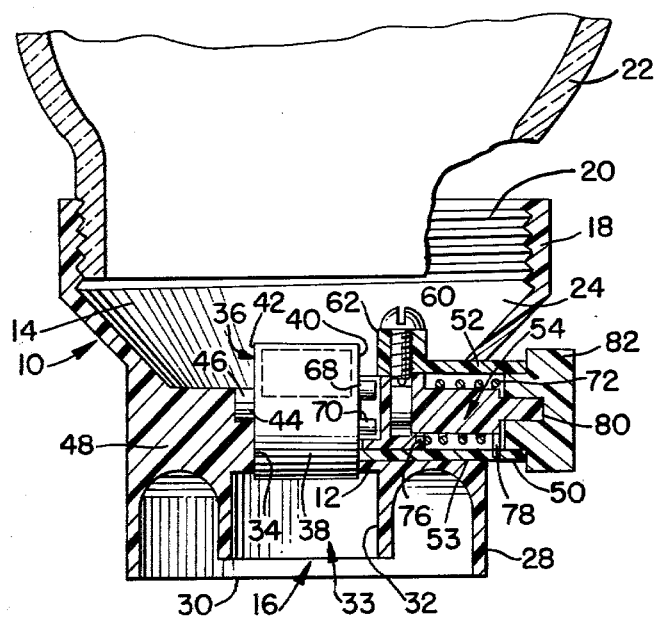
FIG. 2 is a sectional view of the dispenser of FIG. 1 and including a partial section of a container to which the dispenser may be connected.
Figure 3:
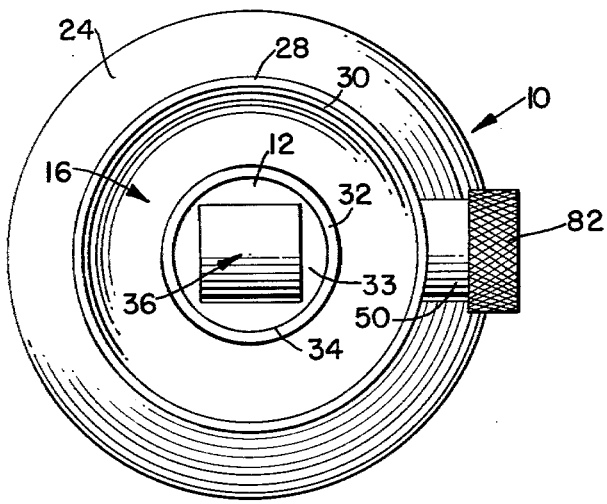
FIG. 3 is a bottom plan view of the dispenser of FIG. 1.

Turning now to a more detailed consideration of the dispensing device of the present invention, there is illustrated in FIGS. 1, 2 and 3, a manually operable sugar dispenser 10 which is generally cylindrical in shape and which is divided by a horizontal divider wall 12 into an upper filling chamber 14 and a lower dispenser chamber 16. Although the dispenser unit 10 may be described as being generally cylindrical in shape, it will be understood that its side walls may take a variety of shapes and may be of various dimensions for decorative purposes or to provide desired stability for the container to which it is attached. In a preferred form, however, as illustrated herein, the dispenser includes a housing formed by an upper cylindrical wall portion 18 which is internally threaded at 20 to receive the externally threaded open mouth portion of a sugar container, or reservoir, 22 which typically will be a glass-walled jar or the like of conventional design. The external threads on container 22 permits the dispenser unit 10 to be threaded onto the mouth portion to close it and thereby permit regulation of the flow of sugar or other condiment therefrom.

The cylindrical wall portion 18 of the dispenser housing joins a conical wall portion 24 which tapers inwardly and downwardly, as illustrated in FIGS. 1 and 2, to a throat portion 26 of relatively smaller diameter, which portion is closed by the divider wall 12, the wall portions 12, 18 and 24 defining the filling chamber 14.

The bottom portion of the housing of the dispenser unit 10 is defined by a generally cylindrical bottom wall 28 which is secured to, and depends from, the conical wall portion 24 and forms a bottom support edge 30 on which the dispenser unit rests. The wall 28 may be separate from the conical wall 24 but secured thereto as by a suitable adhesive, or may be formed as an integral part thereof. In the preferred form, the bottom portion of the housing further includes a cylindrical inner wall 32 which depends downwardly from the divider wall 12 and is concentric with the cylindrical wall 28. The interior of wall 32 defines a dispensing chute 33, wall 32 serving to protect the dispensing aperture and transfer drum to be described.

In the preferred form of the invention, the conical wall 24 of the housing is unitary with the cylindrical wall portions 18 and 28, the interior surface of the conical portion 24 having a continuously sloping surface down to the throat 26. The divider wall 12 secured within throat 26 is either integrally formed with the housing, or is secured therein by suitable adhesives. This divider wall is formed with a dispensing aperture 34 through which a rotatably or pivotably mounted sugar dispensing mechanism at least partially extends. In the illustrated embodiment, the dispensing mechanism includes a transfer drum 36 having a cylindrical side wall 38 and planar end walls 40 and 42 (see FIG. 4). The drum 36 is mounted so that at least a portion thereof extends through dispensing opening 34 which, in the illustrated example, is rectangular in shape and which has a length equal to the axial length of the cylindrical drum and a width that is less than the diameter of the drum so that the drum fits snugly into opening 34, but cannot pass completely through it.

The drum 36 is mounted for rotation about an axial shaft 44 which extends into and is supported by a slot 46 formed in a shoulder portion 48 located within the filling chamber 14. The shoulder portion is either formed on the conical wall portion 24, as an integral part of the housing, or may be adhesively secured to the interior surface of the sloping wall 24, the location of shoulder 48 and the depth of slot 46 cooperating with the axial shaft 44 to locate drum 36 in opening 34.

Located in the housing diametrically opposite the slot 46 in shoulder 48 is a rotational drive mechanism for drum 36. This drive mechanism preferably is mounted in a cylindrical drive housing 50 which, in the illustrated embodiment, is aligned with the axis of drum 56 and passes through aperture 52 in the conical wall 24 and aperture 53 in wall 28 and is secured therein as by a suitable adhesive. Alternatively, the drive housing 50 can be formed as an integral part of the dispenser housing, if desired. Within housing 50 is a rotatable drive shaft 54, (see FIG. 5) which includes an enlarged end portion 55 in which is located a circumferentially extending slot 56 adapted to be aligned with and engaged by a stop screw 60. The stop screw is threaded through an aperture in a corresponding collar 62 formed on housing 50, extending through the collar 62 and into the interior of housing 50 to engage slot 56 when the drive shaft is properly positioned in the housing 50. The stop screw cooperates with slot 56 to secure the drive shaft against longitudinal (axial) motion, while permitting rotation of the shaft about its axis. The slot 56 is of limited circumferential extent so as to restrict the rotation of shaft 54, preferably to 120°, so that the rotation of the transfer drum 36 will be similarly limited, as will be explained.

Drive shaft 54 carries on its end face 64 a diametrically extending slot 66 which is adapted to receive a pair of turning studs 68 and 70 located on the end wall 40 of drum 36. These turning studs act as keys in slot 66 so that rotary motion of the drive shaft 54 is transmitted to drum 36 (see FIG. 2).

Figure 5:
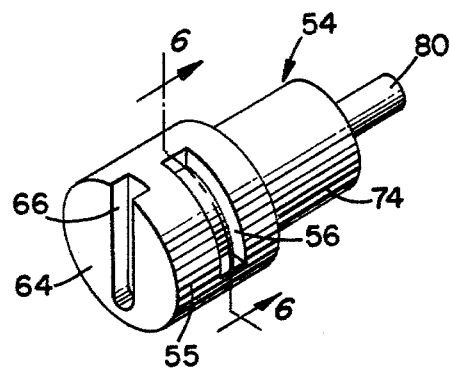
FIG. 5 is a perspective view of the drive shaft for the dispenser of the invention.
Figure 6:
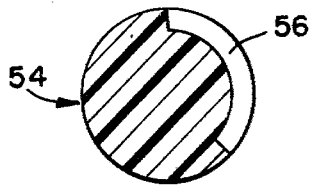
FIG. 6 is a sectional view of the drive shaft taken along line 6—6 of FIG. 5.

The drive shaft 54 of the illustrated embodiment also includes an intermediate portion of reduced diameter, around which is wound a bias spring 72, the spring being located at the reduced portion 74 (FIG. 5). One end of the spring engages a hole 76 located on the driving shaft (see FIG. 2), while the other end of the spring engages a corresponding hole 78 in the housing 50, whereby the spring biases the drive shaft so that in the rest position one end of the slot 56 abuts the stop screw 60 to hold the transfer drum 36 in the illustrated rest position.

Secured on a smaller diameter end portion 80 of the shaft 56 is a turning know 82 of relatively large dimension which enables a user of the dispenser to easily rotate the driving shaft 54 and thus the drum 36. The exterior surface of knob 82 may be knurled to allow easy grasping and, when turned in a direction permitted by the slot 56 and stop screw 60, will rotate drum 36 through an angle limited by the circumferential length of slot 56. The turning motion is against the bias of spring 72 and serves to tighten the spring so that when the dispensing knob is released, the spring action will return the drum of its original position, away from the dispensing angular position.

Figure 4:
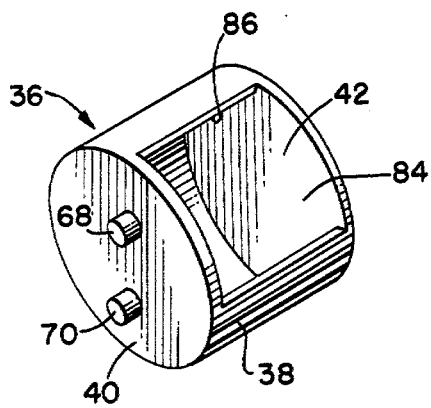
FIG. 4 is a perspective view of the transfer drum used in the device of FIG. 1.

Transfer drum 36 includes a receptacle which, as best seen in FIGS. 1 and 4, preferably is a cavity 84 formed within the drum. The cavity opens to the exterior of the drum through a surface aperture 86, with the interior of the drum thus defining a dispensing cavity which may be filled and emptied through opening 86.

It will be understood that the above described construction allows easy assembly and disassembly of the dispensing unit, assembly being effected simply by sliding the drive shaft 54 into its cylindrical housing 50, locating spring 72 around the drive shaft and securing it to the shaft and to the housing, inserting stop screw 60 in its collar 62 to position the drive shaft, connecting the turning knob to the driving shaft, and then simply dropping the transfer drum into slots 46 and 66. Disassembly is equally easy to accomplish so that it becomes a simple task to keep the container clean and moisture free and in good operating condition. This arrangement further allows the transfer drum to be interchangeable so that drums having various sizes of dispensing cavities can be inserted to to control the usage of sugar.

In operation, after assembly of the dispensing unit, the unit is secured to a bulk sugar container 22 and the device is ready for use. In normal usage, the device will be placed on a table, counter or the like, resting on the base edge 30. In this rest position, the drum 36 is biased in the manner illustrated so that aperture 84 is facing upwardly into the filling chamber 14 of the dispenser unit. Sugar flows into and fills the cavity 86, but the dispensing mechanism is protected from damage or contamination because it is on the bottom of the container and is protected by the base wall 28 and the dispensing chute wall 32. Further, the bias position of the drum 36 insures that the container remains closed so that there is no leakage of sugar, and no entrance of moisture into the container. When a serving of sugar is required, the user need only pick up the container, and, while holding it in the vertical position illustrated, turn the dispensing knob 82 in a clockwise direction (as seen in FIG. 2). This operation causes the slot 66 to drive stud shafts 68 and 70 to rotate the transfer drum 36, again in a clockwise direction, moving the aperture 86 through the opening 34 in wall 12 to dump the sugar contained in cavity 84 down through the discharge chute 33. Upon emptying of the cavity and release of the dispensing knob, the spring returns the dispensing drum to its original position.

Figure 7:
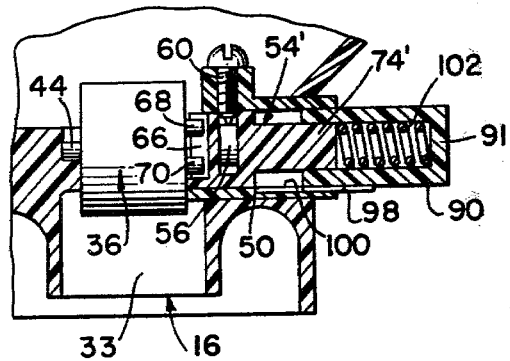
FIG. 7 is a partial sectional view of a modified form of the dispenser of the invention.
Figure 8:
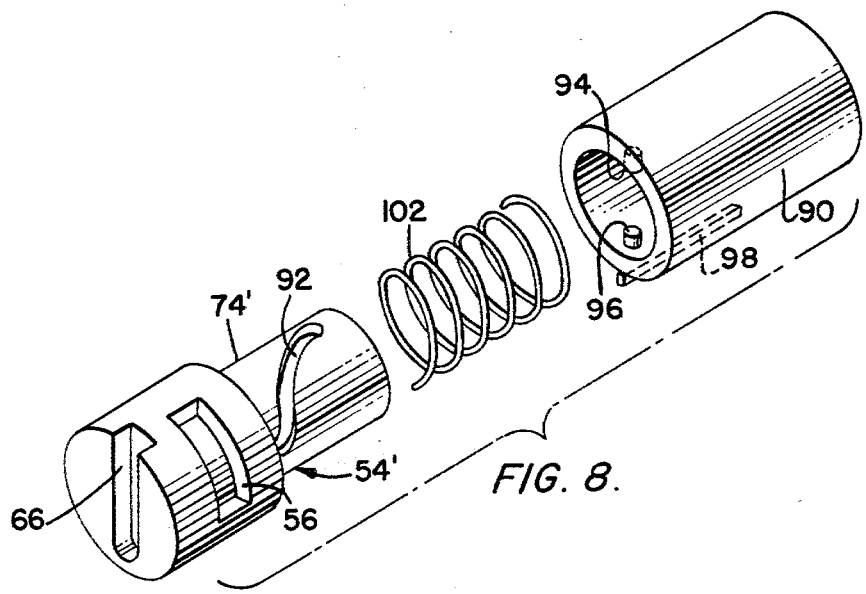
FIG. 8 is an exploded perspective view of the drive shaft and push-button mechanism for the device of FIG. 7.

In the alternate form of the invention illustrated in FIGS. 7 and 8, where similar elements carry the same identifying numbers as given above, rotation of the transfer drum is accomplished by means of a push button rather than a turning knob. As shown in the figures, the drum 36 is mounted, as before, by means of an axial shaft 44 and a pair of stud shafts 68 and 70 mounted in a diametrically extending slot 66 formed in a driving shaft 54'. Shaft 54' is similar to shaft 54, but instead of having a small diameter portion 80, the intermediate section 74 is extended, as seen at 74' in FIGS. 7 and 8. The intermediate portion 74' is surrounded by a push button 90 in the form of a sleeve, closed at the outer end 91 and open at the inner end to receive shaft portion 74', with the exterior of the push button adapted to fit slideably in the housing 50. Shaft portion 74' is provided with a pair of curved slots located on diametrically opposite sides of the shaft, one such slot being illustrated 92 in FIG. 8.

The push button sleeve includes a pair of stud shafts 94 and 96 which are adapted to engage the slots on the drive shaft, the curvature of the slot causing the shaft to rotate as the push button is moved axially with respect thereto. To prevent the push botton from rotating, an axially extending key is provided on the outer surface of the push button 90 which is adapted to engage a corresponding keyway 100 formed in the housing 50. The push button 90 is biased axially outwardly along shaft 74' by means of a biasing spring 102 located between the end of shaft 74' and the interior of end wall 91 of the push button as illustrated in FIG. 7.

When the modified form of the dispenser mechanism is assembled in the manner illustrated in FIG. 7, so that the drive shaft 74' is secured in place by means of a stop screw 60 engaging slot 56 and with the push button 90 mounted on the end of the shaft portion 74', it will be seen that by depressing the push button 90 inwardly, the stud shafts 94 and 96 engage the slots 92 to force the drive shaft 54' to rotate in a clockwise direction, the degree of rotation depending upon the shape and extent of slots 92. As before, it is preferred that the slots produce a rotation of approximately 120° so that the opening 86 of the dispensing cavity 84 within drum 36 will be rotated out of the filling chamber and into dispensing chute 16, in the manner previously described. Upon release of the push button 90, spring 102 returns the dispensing drum to its original location by pressing the push button outwardly.

From the foregoing it will be seen that the present invention provides a new and unique dispensing mechanism for sugar containers which serves to quickly and easily dispense predetermined quantities of sugar, and at the same time, to provide maximum protection of the bulk sugar and of the dispensing mechanism from contamination from the atmosphere and by contact with food or serving utensils. Although the invention has been described in terms of a preferred embodiment thereof, it will be apparent to those of skill in the art that numerous variations and modifications can be made without departing from the true spirit and scope as set forth in the following claims:

I claim:

1. A manually operable dispenser adapted to be threadedly secured to the open mouth of a bulk container and operable to serve predetermined quantities of a material such as sugar, the dispenser serving to support the container in an inverted position and comprising:
   a dispenser housing having an internally threaded upper portion adapted to engage the mouth portion of a container and having a lower portion defining a dispensing chute and a support base;
   a divider wall in said housing and cooperating with said support portion of said housing to define a filling chamber;
   a dispensing aperture in said divider wall to provide communication between said filling chamber and said dispensing chute;
   transfer means comprising a hollow drum, the interior of which forms a receptacle of predetermined size for receiving a predetermined quantity of material from said filling chamber;
   means for mounting said hollow drum for axial rotation in said dispensing aperture so that said hollow drum blocks the passage of material from said filling chamber to said dispensing chute, the axis of said drum being parallel to but located above said divider wall so that a limited portion of the circumference of said drum extends downwardly through said divider wall;
   means for manually and selectively rotating said hollow drum to move said drum in a first direction to carry said receptacle out of said filling chamber, through said dispensing aperture to said dispensing chute whereby a predetermined quantity of material may be deposited in said dispensing chute for delivery out of the container; and
   biasing means for rotating said transfer means in a second direction to normally maintain said receptacle in communication with said filling chamber.

2. The dispenser of claim 1, wherein said means for rotating said transfer drum comprises:
   a drive shaft housing extending into said dispenser housing;
   a rotary drive shaft mounted in said drive shaft housing and engaging said transfer drum; and
   drive means for rotating said drive shaft to thereby rotate said transfer drum.

3. The dispenser of claim 2, wherein said biasing means includes spring means for rotating said drive shaft to maintain said receptacle in communication with said filling chamber.

4. The dispenser of claim 2, wherein said drive means includes manually rotatable knob means secured to said drive shaft.

5. The dispenser of claim 2, wherein said drive means includes:
   push button means axially movable with respect to said drive shaft; and
   means on said drive shaft for converting axial motion of said push button to rotary motion of said drive shaft.

6. The dispenser of claim 2, further including stop means adapted to engage said means for rotating said transfer drum to limit the rotation thereof.

7. The dispenser of claim 6, wherein said stop means includes a stop screw mounted in said drive shaft housing and a corresponding circumferential guide slot in said drive shaft.

8. The dispenser of claim 7, wherein said guide slot extends approximately 120° around the circumference of said drive shaft, whereby the rotation of said transfer drum and said receptacle are limited to permit complete movement of said receptacle between said filling chamber and said dispensing chute, while insuring that said dispensing aperture remains normally closed to maintain a seal between said filling chamber and said dispensing chute.

9. The dispenser of claim 8, wherein said lower portion of said dispenser housing comprises a first depending wall portion defining said dispensing chute, said first wall portion surrounding said dispensing aperture, and a second depending wall portion surrounding said dispensing chute, said second wall portion forming said support base for said dispenser.

10. A manually operable dispenser adapted to be threadedly secured to the open mouth of a bulk container and operable to dispense predetermined quantities of a material such as sugar, the dispenser serving to support the container in an inverted position, comprising:
   a dispenser housing having an internally threaded upper portion adapted to engage the mouth of a container and having a lower dispensing portion;
   a divider wall in said housing cooperating with said upper portion of said housing to define a filling chamber and cooperating with said lower portion of said housing to define a dispenser chamber, said dispenser chamber including a dispensing chute and a support base for said housing;
   a dispensing aperture in said divider wall to provide communication between said filling chamber and said dispensing chute;
   interchangeable transfer means including a replaceable transfer drum having a dispensing cavity which forms a receptacle for receiving material from said filling chamber;
   means for mounting said transfer drum above said dispensing aperture so that said drum blocks the passage of material from said filling chamber to said dispensing chute, said mounting means including an axial shaft on said drum and a correspondind support slot formed within said filling chamber;
   means for selectively rotating said transfer drum about said axial shaft in a first direction to rotate said cavity from said filling chamber to said dispensing chamber, said rotating means including a drive shaft housing extending into said dispenser housing, a rotary drive shaft mounted in said drive shaft housing, and a pair of stub shafts on said transfer drum engaging a corresponding slot in said rotary drive shaft, whereby rotation of said drive shaft rotates said transfer drum;

drive means for selectively rotating said drive shaft in said first direction, said drive means including push buttom means axially movable with respect to said drive shaft and means to converting the axial motion of said push button to rotary motion of said drive shaft; and biasing means for rotating said transfer drum in a second direction to normally maintain said cavity in communication with said filling chamber.

11. The dispenser of claim 10, further including a stop screw mounted in said drive shaft housing and extending into a corresponding circumferential slot formed in said drive shaft, said stop screw and circumferential slot limiting the rotation of said drive shaft and further retaining said drive shaft in said drive shaft housing.

12. The dispenser of claim 11, wherein said means for converting the axial motion of said push button to rotary motion of said drive shaft comprises a curved guide slot on said drive shaft and a corresponding stud on said push button extending into and engaging said curved guide slot.

13. The dispenser of claim 12, wherein said circumferential slot extends approximately 120° around the circumference of said drive shaft, whereby the rotation of said transfer drum is limited to permit movement of said cavity between said filling chamber and said dispensing chamber, while insuring that said dispensing aperture remains normally closed.

* * * * *